(12) United States Patent
Kang et al.

(10) Patent No.: US 7,449,231 B2
(45) Date of Patent: Nov. 11, 2008

(54) WOOD FLOORING LAMINATED WITH HIGH PRESSURE VENEER AND IMPREGNATED LOW WEIGHT PRINTING PAPER

(75) Inventors: Seog-Goo Kang, Cheongju-si (KR); Soo-Hwan Lee, Incheon (KR); Ill-Hong Min, Cheongju-si (KR)

(73) Assignee: LG Chem, Ltd. (KR)

( * ) Notice: Subject to any disclaimer, the term of this patent is extended or adjusted under 35 U.S.C. 154(b) by 596 days.

(21) Appl. No.: 11/087,989

(22) Filed: Mar. 23, 2005

(65) Prior Publication Data

US 2006/0062966 A1  Mar. 23, 2006

(30) Foreign Application Priority Data

Sep. 21, 2004  (KR) ............. 10-2004-0075489

(51) Int. Cl.
- *B32B 3/00* (2006.01)
- *B32B 29/00* (2006.01)
- *B44C 5/04* (2006.01)
- *B44F 9/02* (2006.01)
- *E06B 5/00* (2006.01)

(52) U.S. Cl. .......... 428/172; 428/211.1; 428/535; 428/537.5; 52/313; 52/390

(58) Field of Classification Search .......... 428/156, 428/167, 172, 211, 211.1, 535, 537.5; 52/313, 52/390

See application file for complete search history.

(56) References Cited

U.S. PATENT DOCUMENTS

| 5,736,227 A | 4/1998 | Sweet et al. ............ 428/192 |
| 2002/0136862 A1* | 9/2002 | Dong et al. ............ 428/150 |

OTHER PUBLICATIONS

WO 2004/098881, Nov. 2004.*

* cited by examiner

*Primary Examiner*—Donald Loney
(74) *Attorney, Agent, or Firm*—Cantor Colburn LLP

(57) ABSTRACT

Disclosed herein is a UV surface-coated laminate wood flooring for an under-floor heating system comprising a back-grooved base, an adhesive layer and a printed wood veneer layer wherein the printed wood veneer layer is produced by impregnating and coating a low-basis weight printed paper with a thermoplastic or thermosetting resin, integrally forming the paper layer with a low-price reinforcing layer by pressing under high pressure, treating the surface of the paper layer with an acryl based primer, and coating the primer-treated paper layer with a solvent-free type UV coating paint, and wherein the back-grooved base and the printed wood veneer layer are adhered to each other by the adhesive layer.

7 Claims, 1 Drawing Sheet

WOOD FLOORING LAMINATED WITH HIGH PRESSURE VENEER AND IMPREGNATED LOW WEIGHT PRINTING PAPER

TECHNICAL FIELD

The present invention relates to a back-grooved laminate wood flooring for an under-floor heating system which comprises a base selected from a polyvinyl chloride resin layer, an oriented strand board (OSB), a high-density fiberboard (HDF) and a waterproof plywood layer, and a printed wood veneer layer laminated thereon. More specifically, the present invention relates to a UV surface-coated laminate wood flooring for an under-floor heating system comprising a back-grooved base, an adhesive layer, and a printed wood veneer layer wherein the printed wood veneer layer includes a veneer layer, a resin-impregnated low-basis weight paper layer and a primer-treated UV coating layer laminated in this order from the bottom, and the back-grooved base and the printed wood veneer layer are adhered to each other by the adhesive layer.

BACKGROUND ART

FIG. 1 is a cross-sectional view of conventional wood flooring for an under-floor heating system in which an untreated natural veneer layer is laminated on a waterproof plywood layer. As shown in FIG. 1, the conventional wood flooring has a structure wherein the natural veneer layer 24 is surface-coated with a UV coating paint to form a general UV coating layer 21' or is resin-impregnated, and is then laminated on the waterproof plywood layer 10' through an adhesive layer 40.

The respective layers constituting the conventional wood flooring for an under-floor heating system are briefly explained below with reference to FIG. 1.

The waterproof plywood layer 10' is produced by layering 5 to 7 veneers together using a phenol or melamine resin adhesive in such a manner that the grain directions of the veneers are at right angles to one another, and pressing the laminate using a press.

The upper natural veneer layer 24 is produced by impregnating or unimpregnating a natural veneer with an impregnating resin, or impregnating the resin into the natural veneer under reduced or high pressure. The surface UV coating layer 21' is produced by subjecting the upper natural veneer to top, intermediate or under coating 6~10 times using urethane acrylate paint by common techniques.

Since the conventional flooring for an under-floor heating system comprises the waterproof plywood layer 10' and the waterproof plywood layer 24 laminated thereon, it exhibits excellent dimensional stability against heat and moisture.

However, a conventional flooring comprising the waterproof plywood layer 10' and the untreated upper natural veneer laminated thereon exhibits a surface scratch resistance as low as 0.5~1N and an impact resistance as low as 10~20 cm due to a low density of the waterproof plywood layer 10' despite the presence of the surface UV coating layer 21' on the untreated upper natural veneer. The scratch resistance is measured by scratching the surface UV coating layer 21' using a diamond needle, and the impact resistance is measured by dropping a metal ball weighing 225 g onto the surface of the natural veneer. There is a large possibility that the conventional wood flooring is easily impaired when laying heavy-weight household appliances on the wood flooring and using them. Accordingly, the conventional wood flooring causes consumer complaints and cannot satisfy consumer's diverse needs. There is, thus, a need for a wood flooring having improved scratch resistance and impact resistance.

Wood floorings having a surface reinforcement structure were suggested in which two melamine-impregnated overlay sheets are laminated at the upper and lower portions of a natural veneer. The prior art wood floorings have a higher surface strength than any other conventional UV-coated wood flooring, but have problems that the natural texture is poor and curls are likely to occur, which negatively affects the quality of the finished products. In addition, they show poor adhesion of the impregnated overlay layers to the veneer.

Further, a laminate wood flooring with a melamine veneer laminate wood flooring (LPM flooring) wherein a titanium dioxide ($TiO_2$)-containing paper having a basis weight of 70~80 $g/m^2$ is impregnated with a melamine resin shows good surface physical properties, e.g., a scratch resistance of about 3N and an impact resistance of about 40 cm. However, the use of the titanium dioxide-containing paper for maximized resin impregnation causes poor printability despite superior impregnation performance, compared with a low-basis weight tissue paper. In addition, the application of an acrylate-type UV coating paint is impossible due to impregnation of the melamine. Furthermore, the impregnated melamine is very cold to the touch and static electricity is likely to occur due to its nature.

Volatile organic compounds (VOCs) resulting from the use of organic solvents, including formaldehyde, cause sick house syndrome, which has recently become a health problem. Under this circumstance, there is a demand for an environmentally friendly finishing material.

DISCLOSURE

[Technical Problem]

Therefore, the present invention has been made in view of the above problems, and it is an object of the present invention to provide a laminate wood flooring for an under-floor heating system with greatly improved adhesion and surface strength by impregnation of a low-basis weight printed paper and integration technique of the printed paper and a reinforcing layer.

It is another object of the present invention to provide a laminate wood flooring for an under-floor heating system with excellent printability, improved touch, and ensured natural texture.

It is yet another object of the present invention to provide a back-grooved laminate wood flooring for an under-floor heating system with additional soundproofing performance and made of environmentally friendly materials at reduced costs.

[Technical Solution]

In order to accomplish the above objects of the present invention, there is provided a laminate wood flooring for an under-floor heating system, comprising a back-grooved base, an adhesive layer, and a printed wood veneer layer laminated in this order from the bottom wherein the printed wood veneer layer includes a reinforcing layer, a resin-impregnated low-basis weight paper layer, and a primer-treated UV coating layer laminated in this order from the bottom.

According to the present invention, the use of a low-basis weight tissue paper (25~50 $g/m^2$) in the UV surface-coated laminate wood flooring improves poor reality, which is a problem of a conventional laminate wood flooring using a titanium dioxide ($TiO_2$)-containing high-basis weight paper (70~80 $g/m^2$). A series of the acryl based primer treatment and the UV coating solves difficult UV coating, coldness to the touch, occurrence of static electricity, and the like, which are problems of a low-pressure melamine (LPM) flooring wherein a melamine resin is impregnated. The additional resin coating and the pressing operation using a high-pressure press solve poor adhesion between the reinforcing layer and the resin-impregnated low-basis weight paper layer and achieve surface reinforcement. Due to these advantages, the laminate wood flooring exhibits high-definition printability and a natural touch texture of the UV coating, comparable to natural veneer, and further improves disadvantages of conventional wood floorings for an under-floor heating system, e.g., poor scratch resistance and impact resistance. In addition, the formation of grooves on the back surface of the base improves surface strength when compared to a conventional wood flooring for an under-floor heating system, and the addition of one or more soundproof layers can impart improved soundproofing performance to the laminate wood flooring. The use of the solvent-free type UV coating material is environmentally friendly.

The resin-impregnated low-basis weight paper layer is produced by printing a tissue paper having a basis weight of 25~50 g/m$^2$ and impregnating the printed tissue paper with a resin selected from urea, urea-melamine, melamine, phenol, acryl, polyester, unsaturated polyester, epoxy, polyvinyl acetate, polyvinyl alcohol, and urethane resins. The use of the low-basis weight tissue paper improves poor reality, which is a problem of conventional products, to achieve superior printability, such as high-definition printability.

The laminate wood flooring of the present invention is characterized in that the reinforcing layer and the resin-impregnated low-basis weight paper layer are integrally formed by coating a resin selected from urea, urea-melamine, melamine, phenol, acryl, polyester, unsaturated polyester, epoxy, polyvinyl acetate, polyvinyl alcohol and urethane resins, and pressing the coating in a high-pressure press. This pressing improves poor adhesion and compacts the surface to achieve surface reinforcement.

The primer-treated UV coating layer is produced by coating an acryl based primer on the resin-impregnated low-basis weight paper layer, followed by UV coating. The primer treatment and UV coating employed in the present invention is a new technique by which an amino-based resin (i.e. urea, melamine or urea-melamine resin)-impregnated product, which cannot be treated by conventional coating processes, is coated.

The acryl based primer used in the present invention solves the conventional problems, such as difficult UV coating, coldness to the touch, and occurrence of static electricity. In addition, the use of the acryl based primer and the solvent-free UV coating paint can prevent incidences of sick house syndrome and can provide environmentally friendly finishing materials.

Since an acryl based resin generally has better impregnation properties than a urethane based resin, coating using the acryl based primer leads to improved adhesion as compared to that using a urethane based primer.

An actual line test revealed that the acryl based resin is suitable for mass production of the laminate wood flooring according to the present invention at considerably advantageous costs because of superior impregnation properties of the acryl based resin to a urethane based resin. In addition, an acryl based primer was confirmed to have superior adhesion to the acryl based resin when compared to a urethane based primer.

Basically, it is known that the physical properties (e.g., strength and adhesion) of a urethane based resin are superior to those of an acryl based resin. However, taking into consideration the mass production of the laminate wood flooring according to the present invention, impregnation with the acryl based resin and coating of the acryl based primer are advantageous.

The reinforcing layer used in the present invention is selected from a veneer, a shielding paper, a high-density fiberboard (HDF), and a craft paper. The use of the low-price reinforcing layer and resin-impregnated layer enables improvement of surface physical properties at low costs.

Depending on the desired thickness of the reinforcing layer and the resin-impregnated low-basis weight paper layer, several sheets can be layered.

For reducing noise transmission between floors and imparting improved soundproofing performance, the laminate wood flooring of the present invention may further comprise at least one soundproof layer laminated in at least one position selected from (a) between the base and the printed wood veneer layer and (b) below the base.

The base used in the present invention is selected from a polyvinyl chloride resin layer, an oriented strand board (OSB), a high-density fiberboard (HDF) and a waterproof plywood layer, and is preferably back-grooved to ensure improved dimensional stability and reduced occurrence of cracks.

The back-grooved laminate wood flooring of the present invention comprising the waterproof plywood layer and the printed wood veneer layer laminated thereon is manufactured in accordance with the following procedure.

First, a base selected from a polyvinyl chloride resin layer, an OSB, an HDF, a waterproof plywood layer, and the like, is prepared. In the case that the waterproof plywood layer is used as the base, 5 to 7 veneers are layered together using a phenol or melamine resin adhesive in such a manner that the grain directions of the veneers are at right angles to one another, and then the laminate is pressed in a press to produce the base.

Next, a printed low-basis weight tissue paper having a basis weight of 50 g/m$^2$ or less is impregnated with a resin selected from urea, urea-melamine, melamine, phenol, acryl, polyester, unsaturated polyester, epoxy, polyvinyl acetate, polyvinyl alcohol and urethane resins, and an additional coating is carried out only on one side of the impregnated tissue paper using a resin, such as melamine, to ensure sufficient adhesion to a reinforcing layer, thereby producing surface layers of the flooring.

Thereafter, the resin-impregnated low-basis weight printed paper layer is laminated on a reinforcing layer, such as veneer, and then the resulting laminate is pressurized under high pressure at high temperature to produce a high-density printed wood veneer layer.

Finally, the surface of the printed wood veneer layer is subjected to primer treatment and UV coating and the back surface of the base is grooved to manufacture the laminate wood floor of the present invention.

Preferably, for the purpose of reducing noise transmission between floors and imparting improved soundproofing performance, at least one soundproof layer may be laminated (a) between the printed wood veneer layer and the base and/or (b) below the base.

[Advantageous Effects]

By integration technique of the reinforcing layer and the resin-impregnated layer and a series of primer treatment and UV coating, the laminate wood flooring of the present invention exhibits scratch resistance and impact resistance superior to conventional flooring products. In addition, the use of the low-basis weight tissue paper improves poor reality to achieve superior printability, such as high-definition printability. The development of acryl based primer treatment and UV coating techniques on the low-basis weight paper layer impregnated with a resin selected from amino, acryl, polyester, urethane, and other resins enables marked improvements in surface strength and natural texture.

The acryl based primer treatment, followed by UV coating, solves the conventional problems, such as difficult UV coating, coldness to the touch, and occurrence of static electricity. The additional resin coating and the pressing operation using a high-pressure press solve-poor adhesion between the reinforcing layer and the resin-impregnated low-basis weight paper layer and achieve surface reinforcement. The formation of grooves on the back surface of the base improves surface strength when compared to a conventional flooring for an under-floor heating system, and the addition of one or more soundproof layers can impart improved soundproofing performance to the laminate wood flooring of the present invention.

Moreover, in order to improve the surface physical properties of the laminate wood flooring according to the present invention, a low-price veneer is used as a material for the reinforcing layer and a paper impregnated with a heat-curable resin (melamine or phenol resin) is used as a material for the resin-impregnated low-basis weight paper layer, instead of a phenol-impregnated paper used in a conventional high-pressure melamine (HPL) laminate. Accordingly, the curling properties of the final product are markedly improved and manufacturing costs of the final product are greatly reduced. The solvent-free type UV coating material used in the present invention is environmentally friendly.

DESCRIPTION OF DRAWINGS

The above and other objects, features and other advantages of the present invention will be more clearly understood from the following detailed description taken in conjunction with the accompanying drawings, in which.

BEST MODE

The present invention will now be described in more detail with reference to the following examples and accompanying drawings. However, these examples and drawings are not to be construed as limiting the scope of the invention.

Figure 2:
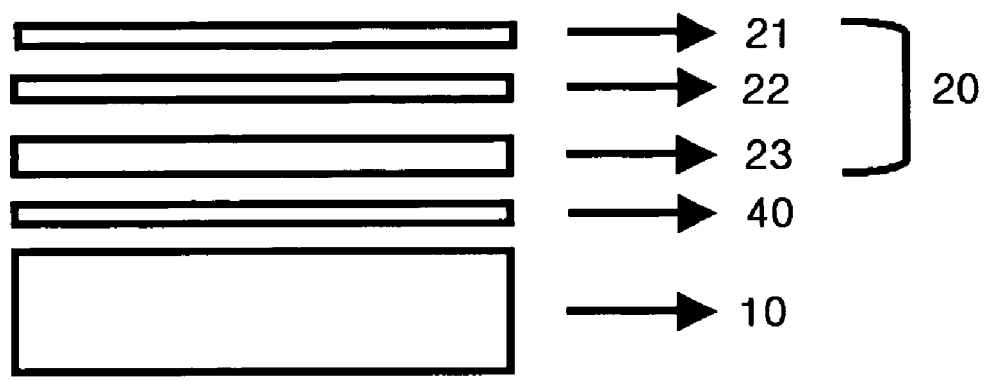
FIG. 2 is a cross-sectional view of a UV surface-coated laminate wood flooring for an under-floor heating system according to one embodiment of the present invention in which a printed wood veneer layer is laminated on a back-grooved base.

A UV surface-coated laminate wood flooring for an under-floor heating system according to one embodiment of the present invention is shown in FIG. 2 in which a printed wood veneer layer 20 is laminated on a back-grooved base 10. The laminate wood flooring has a structure wherein the printed wood veneer layer 20 and the base 10 are adhered to each other by an adhesive layer 40.

The printed wood veneer layer 20 includes a veneer (or at least one material selected from shielding paper, HDF, and kraft paper) reinforcing layer 23, a resin-impregnated low-basis weight paper layer 22, and an acryl based primer-treated special UV coating layer 21 laminated in this order from the bottom.

The printed wood veneer layer 20 is produced by laying the resin-impregnated low-basis weight paper layer 22 on the reinforcing layer 23, pressurizing the laminate in a press under a pressure 20~200 kg/cm² while heating to a temperature 110~180° C. for 15~60 minutes, cooling the pressed laminate under the same pressure for 15~30 minutes, and forming the acryl based primer-treated UV coating layer 21 on the surface of the laminate.

The printed wood veneer layer 20 thus produced and the base 10 are adhered to each other by the adhesive layer 40.

Examples of adhesives used to produce the adhesive layer 40 include thermosetting melamine and thermosetting or room temperature-curable urethane and epoxy resins.

When the thermosetting melamine resin is used as the adhesive, it is applied to the base 10 in an amount of 80~300 g/m² to form the adhesive layer 40. On the other hand, when the thermosetting or room temperature-curable urethane or epoxy resin is used as the adhesive, it is applied to the base 10 in an amount of 80~250 g/m² to form the adhesive layer 40. Thereafter, the printed wood veneer layer 20 is laid on the adhesive layer 40. When the thermosetting melamine resin is used as the adhesive, the laminate is pressurized and cured under a pressure of 10~15 kgf/cm² for 1~5 minutes. Meanwhile, when the room temperature-curable urethane or epoxy resin is used as the adhesive, the laminate is pressed under a pressure of 10~15 kgf/cm² for 2~4 hours and is then cured at 80° C. for 2 hours.

Pressing of the base 10 and the printed wood veneer layer 20 at room temperature can minimize deformation due to heat.

Figure 3:
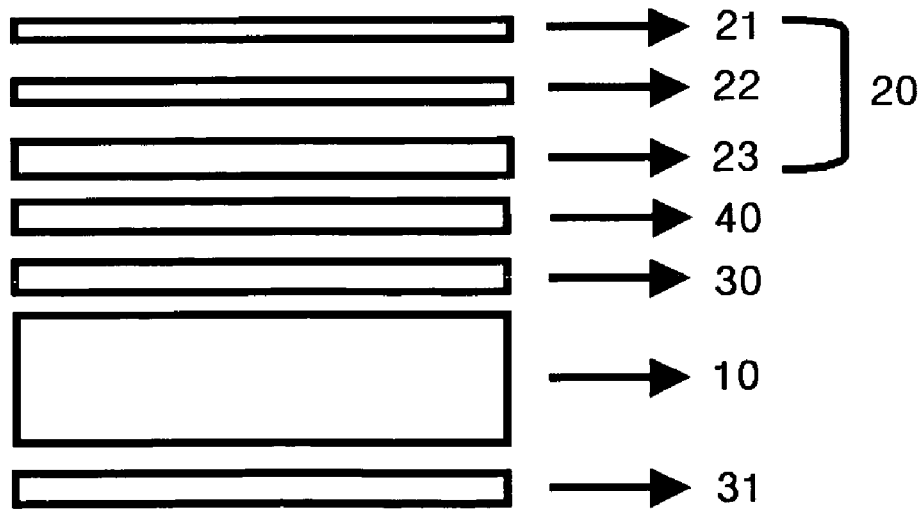
FIG. 3 is a cross-sectional view of a UV surface-coated laminate wood flooring for an under-floor heating system according to another embodiment of the present invention in which two soundproof layers are added to the laminate wood flooring shown in FIG. 2.

A laminate wood flooring for an under-floor heating system according to another embodiment of the present invention is shown in FIG. 2 in which two soundproof layers are added to the laminate wood flooring shown in FIG. 2. As shown in FIG. 3, a first soundproof layer 30 is interposed between the base 10 and the adhesive layer 40, and a second soundproof layer 31 underlies the base 10. However, the position and number of the soundproof layers are not specially limited.

As materials of the soundproof layers, there can be used, for example, polyvinyl chloride (PVC), polyethylene (PE), ethylene vinyl acetate (EVA), polypropylene (PP), polyurethane (PU), polyester non-woven fabric, chloroprene rubber (CR), acrylonitrile butadiene rubber (NBR), etc. In addition, the surface of the soundproof layers can be processed by a chemical crosslinking and foaming process or a high-pressure foaming process, including an embossing and intaglio technique.

EXAMPLE 1

1. Production of Base 10

A polyvinyl chloride resin layer having a thickness of 1.0~5.0 mm was formed of a composition comprising a PVC resin, a plasticizer, a filler, a stabilizer, etc.

A strand board and a high-density fiberboard were produced by pressurizing a strand or a fiber obtained by cutting or fiberizing lumber in a melamine resin, followed by shaping.

A waterproof plywood layer was produced by layering 5 to 7 veneers together using a melamine resin in such a manner that the grain directions of the veneers were at right angles to one another, and pressing the laminate in a press.

2. Production of Printed Wood Veneer Layer 20

1) Production of Primer-Treated UV Coating Layer 21

UV coating was carried out 6~10 times to impart surface protection and high-quality appearance. Treatment of an amino resin-impregnated low-basis weight paper layer 22 with an acryl based primer was carried out, followed by UV coating. For the treatments, solvent-free type acryl based primer and UV coating paint were used.

2) Production of Resin-Impregnated Low-Basis Weight Paper Layer 22

A resin-impregnated low-basis weight paper layer 22 was produced by printing a tissue paper having a basis weight of 25~50 g/m$^2$ using one of 2- to 5 color gravure printers, impregnating the printed tissue paper with a resin selected from urea-melamine, melamine, acryl, urethane and polyester resins, and followed by drying and semi-curing in an oven at 90~150° C. for 10~60 minutes.

3) Production of Reinforcing Layer 23

A veneer was produced by cutting natural raw lumber using a rotary lathe or slicer to a thickness of 0.3~8 mm. If necessary, both sides of the veneer were taped for storage in order to prevent occurrence of cracks in the grain directions upon handling. For improved dimensional stability and minimized bending of the veneer, the veneer was dried to have a water content of 10% or less.

A shielding paper was produced by impregnating a cellulose wood-free paper having a basis weight of 50~150 g/m$^2$ with a phenol or melamine resin, followed by drying and semi-curing in an oven at 80~150° C. for 0.5~3 minutes. Two or more sheets of the shielding paper can be used depending on the desired thickness.

An HDF was produced by treating a fiber obtained from a coniferous or deciduous tree with a phenol resin, followed by shaping, pressurization at high temperature, and curing.

A kraft paper was produced by impregnating an unbleached kraft paper having a basis weight of 80~300 g/m$^2$ with a melamine or phenol resin, followed by drying and semi-curing in an oven at 80~150° C. for 0.5~3 minutes. Two or more sheets of the kraft paper can be used depending on the desired thickness.

4) Integration of Reinforcing Layer 23 and Resin-Impregnated Low-Basis Weight Paper Layer 22

First, a resin, such as melamine, was coated on the bottom surface of the resin-impregnated tissue paper 22, and then the reinforcing layer 23 was laid on the resin. The resulting laminate was pressurized in a press at increasing pressures of 20, 40, 60, 80 and 100 kg/cm$^2$ at 110~170° C. for 15, 20, 25 and 30 minutes, respectively, and cooled under the same pressure for 25 minutes to integrate the two layers.

3. Lamination of Base 10 and Printed Wood Veneer Layer 20

An adhesive layer 40 was formed by applying a thermosetting melamine resin to the base 10 in an amount of 150 g/m$^2$. Alternatively, an adhesive layer 40 was formed by applying a room temperature-curable urethane or epoxy resin to the base 10 in an amount of 200 g/m$^2$. Thereafter, the printed wood veneer layer 20 was laid on the adhesive layer 40. When the thermosetting melamine resin was used, the laminate was pressurized and cured under a pressure of 12 kgf/cm$^2$ for 2~5 minutes. On the other hand, when the room temperature-curable type urethane or epoxy resin was used, the laminate was pressurized under a pressure of 10 kgf/cm$^2$ for 2 hours and was then dried at 80° C. for 2 hours to adhere the printed wood veneer layer 20 to the base 10.

Figure 1:
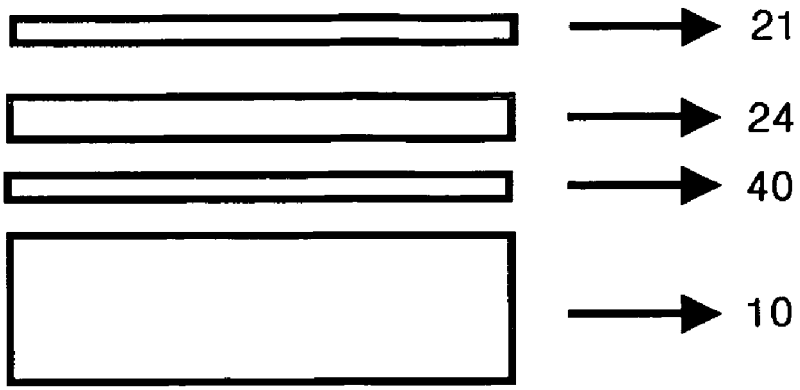
FIG. 1 is a cross-sectional view of a conventional wood flooring for an under-floor heating system in which a natural veneer layer is laminated on a waterproof plywood layer.

The surface physical properties of the laminate wood flooring (Example 1) thus manufactured were compared to those of the conventional natural veneer-decorated wood flooring for an under-floor heating system shown in FIG. 1 (Comparative Example 1). The results are shown in Table 1 below.

The surface strength of the wood floorings was measured in accordance with the following common procedure. First, test pieces having a predetermined size were cut from the wood floorings. The scratch resistance was measured by scratching the surface of the test piece using a diamond needle and was expressed in a 0.5N unit. The impact resistance was measured by dropping a weight (225 g) from increasing heights (increments of 10 cm) onto the surface of the test piece and visually observing the presence of damage to the test piece.

TABLE 1

|  | Example 1 | Comparative Example 1 |
|---|---|---|
| Scratch resistance (N) | 3~4 | 0.5~1 |
| Impact resistance (cm) | 30~40 | 10~20 |

As is apparent from the data shown in Table 1, the surface physical properties of the laminate wood flooring according to the present invention were greatly improved, compared to those of the conventional wood flooring. Specifically, the scratch resistance increased to a maximum of 4N, and the impact resistance increased to a maximum of 40 cm. These results indicate that the integrally formed printed wood veneer layer can considerably improve surface strength and thus can eliminate consumer complaints and satisfy consumer's diverse needs. In addition, the laminate wood flooring of the present invention exhibited high-definition printability and a natural touch texture of the UV coating, comparable to natural veneer.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A laminate wood flooring for an under-floor heating system, comprising a back-grooved base, an adhesive layer, and a printed wood veneer layer laminated in this order from the bottom, wherein the printed wood veneer layer consists of a reinforcing layer, a resin-impregnated low-basis weight paper layer and a primer-treated UV coating layer laminated in this order from the bottom, wherein the resin-impregnated low-basis weight paper is produced by printing a tissue paper having a basis weight of 25~50 g/m$^2$ and impregnating the printed tissue paper with a resin selected from urea resin, urea-melamine resin, melamine resin, phenol resin, acryl resin, polyester resin, unsaturated polyester resin, epoxy resin, polyvinyl acetate resin, polyvinyl alcohol resin, and urethane resin; and wherein the primer-treated UV coating layer is produced by coating an acryl based primer on the resin-impregnated low-basis weight paper layer, followed by UV coating.

2. The laminate wood flooring according to claim 1, wherein the reinforcing layer and the resin-impregnated low-basis weight paper layer are integrally formed by coating a resin selected from urea resin, urea-melamine resin, melamine resin, phenol resin, acryl resin, polyester resin, unsaturated polyester resin, epoxy resin, polyvinyl acetate resin, polyvinyl alcohol resin and urethane resin, and pressing the coating in a high-pressure press.

3. The laminate wood flooring according to claim 1, wherein the acryl based primer and the UV coating paint are solvent-free type.

4. The laminate wood flooring according to claim 1, wherein the reinforcing layer is selected from a veneer, a shielding paper, a high-density fiberboard (HDF) and a craft paper.

5. The laminate wood flooring according to claim 1, wherein several sheets of the reinforcing layer and the resin-impregnated low-basis weight paper layer are used depending on the desired thickness.

6. The laminate wood flooring according to claim 1, further comprising a soundproof layer laminated in at least one position selected from (a) between the base and the printed wood veneer layer and (b) below the base.

7. The laminate wood flooring according to claim 1, wherein the base is selected from a polyvinyl chloride resin layer, a high-density fiberboard (HDF), an oriented strand board (OSB), and a waterproof plywood layer.

* * * * *